United States Patent
Stowe

[15] 3,670,118
[45] June 13, 1972

[54] WINDSCREEN WIPER MOTORS

[72] Inventor: Brian Stowe, Walsall, England

[73] Assignee: Joseph Lucas (Industries) Limited, Birmingham, England

[22] Filed: Jan. 7, 1970

[21] Appl. No.: 1,168

[30] Foreign Application Priority Data

Jan. 17, 1969 Great Britain.....................2,825/69

[52] U.S. Cl.............................................200/47, 200/166 B
[51] Int. Cl........................................................H01h 9/08
[58] Field of Search.................200/168 B, 168 C, 153 T, 47, 200/166 A; 318/266

[56] References Cited

UNITED STATES PATENTS

| | | | |
|---|---|---|---|
| 2,513,247 | 6/1950 | Morton | 318/266 X |
| 3,335,248 | 8/1967 | Bassani | 200/168 C X |
| 3,453,408 | 7/1969 | Mune | 200/168 C |
| 3,453,408 | 9/1969 | Yamada et al. | 200/168 C |

Primary Examiner—Robert K. Schaefer
Assistant Examiner—William J. Smith
Attorney—Holman & Stern

[57] ABSTRACT

A windscreen wiper motor includes a limit switch which is secured to the casing of the motor, co-operating location means provided on the limit switch and the casing for locating the limit switch in the desired position relative to the casing. The limit switch carries a resilient tongue which engages the casing to retain the limit switch in engagement with the casing.

2 Claims, 3 Drawing Figures

WINDSCREEN WIPER MOTORS

This invention relates to windscreen wiper motors, for use in road vehicles, of the kind including a casing housing an electric motor, means for transmitting rotary motion from the electric motor to a wiper mechanism in use, and a limit switch operable by said means at the end of each cycle of the wiper mechanism, said limit switch serving, when a main wiper control switch is opened, to maintain the electric motor operating until the wipers reach the end of a cycle whereupon said limit switch is operated to break the electrical circuit to the electric motor.

According to the invention, in a windscreen wiper motor of the kind specified said limit switch is secured to said casing the casing and said limit switch including co-operating location means for locating the limit switch in the desired position relative to the casing and the switch carrying a resilient tongue which engages said casing to retain the limit switch in engagement with the casing.

One example of the invention is illustrated in the accompanying drawings wherein.

Figure 1:
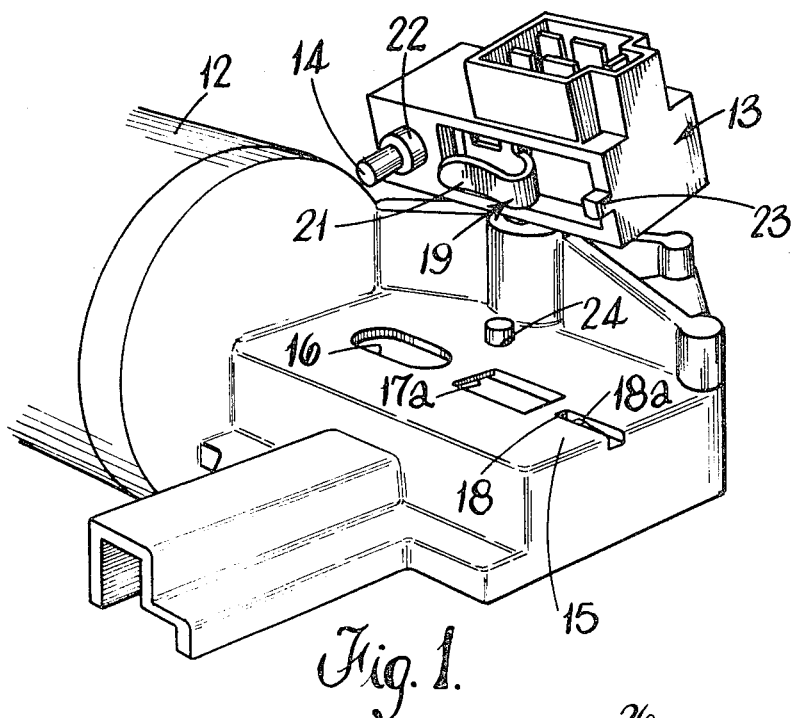
FIG. 1 is fragmentary exploded perspective view of a windscreen wiper motor.
Figure 2:
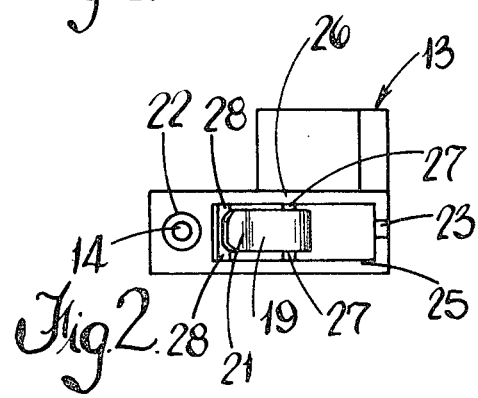
FIG. 2 is an inverted plan view of the limit switch shown in FIG. 1.
Figure 3:
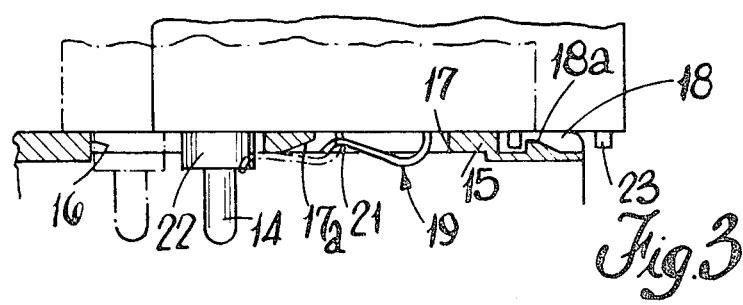
FIG. 3 is a sectional view of part of the casing of the motor shown in FIG. 1, showing the limit switch at two stages during engagement of the switch with the casing.

Referring to the drawings, the windscreen wiper motor includes a casing 11 housing an electric motor at one end 12 thereof. Adjacent the electric motor the casing 11 houses a transmission mechanism, through which the electric motor drives an associated windscreen wiper mechanism.

The windscreen wiper motor further includes a limit switch 13 which is secured to the casing 11 in a manner to be described. The switch 13 includes a plunger 14 which projects through the wall of the casing 11, and which co-operates with a cam constituted by part of said transmission mechanism. The plunger 14 co-operates at its other end with the contacts of the switch 13, and the arrangement is such that when the main windscreen wiper control switch is moved to its open position, then at the end of a cycle of the windscreen wipers, said cam acts on the plunger 14 to open contacts within the switch 13 to break the energizing circuit of the electric motor, and to close further contacts to short circuit the armature winding of the electric motor to achieve dynamic breaking of the motor. Thus the limit switch 13 ensures that even if the main control switch is opened when the windscreen wipers are in the middle of a cycle, then the windscreen wiper motor will continue to drive the wipers until they reach the end of that cycle.

The switch 13 is secured to the casing 11 in the following manner. A wall 15 of the casing 11 is formed with a pair of elongated apertures 16,17, and a channel 18 aligned with the apertures 16,17, the cam with which the plunger 14 of the switch 13 co-operates being adjacent the wall 15. The body of the switch 13 carries a U-shaped metal spring 19 one limb of which constitutes a resilient tongue 21 extending parallel with, but spaced from the lower surface of the body of the switch 13. Adjacent the free end of the tongue 21 the lower surface of the body of the switch 13 is provided with a spigot 22 from which the plunger 14 projects, and at the end of the body of the switch 13 remote from the spigot 22 the body includes an integral locating lug 23.

The switch 13 is secured to the casing 11 by inserting the free end of the tongue 21 into the aperture 17, and inserting the spigot 22 into the aperture 16 and then moving the switch 13 bodily relative to the casing 11 with the lug 23 in the channel 18 so that the tongue 21 engages the inner surface of the wall 15 between the apertures 16 and 17, while the locating lug 23 rides over an inclined ramp 18a in the channel 18. The arrangement is such that the tongue 21 is flexed away from the body of the switch 13 when the switch 13 is in position on the casing 11, so that the resilience of the spring 19 serves to hold the switch firmly in position. The wall 15 of the casing 11 is provided with a post 24 against which one side wall of the body of the switch 13 bears during the movement of the switch 13 relative to the casing 11, the post 24 aiding the action of the spigot 22 in the aperture 16, and the lug 23 in the channel 18, in guiding the movement of the switch 13 relative to the casing 11.

The body of the switch 13 is moulded in synthetic resin material, and is formed in two parts 25,26 which are secured together by ultrasonic welding techniques during manufacture of the switch. The limb of the spring 19 opposite the tongue 21 is provided with two pairs of oppositely directed tags 27,28 which are engaged in respective holes in the parts 25,26 of the body of the switch before the parts 25,26 are ultrasonically welded together. Thus the welding together of the parts 25,26 secures the spring 19 to the body of the switch.

In order to facilitate the engagement of the tongue 21 with the part of the wall 15 between the aperture 16 and the aperture 17, the tongue 21 is formed with an inclined end portion which engages the undercut surface 17a at one end of the aperture 17 during engagement of the switch 13 with the casing 11, the switch 13 being tilted relative to the casing 11 during engagement by the action of the lug 23 on the ramp 18a, and such tilting of the switch further facilitating engagement of the tongue 21 with the wall 15.

Having thus described my invention what I claim as new and desire to secure by Letters Patent is:

1. A windscreen wiper motor, for a road vehicle, including a casing housing an electric motor, means for transmitting rotary motion from the electric motor to a wiper mechanism in use, a limit switch operable by said transmission means at the end of each cycle of the wiper mechanism, said limit switch serving when a main wiper control switch is opened, to maintain the electric motor operating until the wipers reach the end of a cycle whereupon the limit switch is operated to break the electrical circuit of the electric motor, co-operating location means on the limit switch and the casing for locating the limit switch in a desired position relative to the casing, and, a resilient tongue carried by the limit switch, and engaging the casing to retain the limit switch in said desired position on the casing.

2. A motor as claimed in claim 1 wherein said resilient tongue is part of a metal clip secured to the body of the limit switch.

* * * * *